(12) United States Patent
Hilbert et al.

(10) Patent No.: US 11,493,135 B2
(45) Date of Patent: Nov. 8, 2022

(54) NON-CONTACT SEAL WITH AXIAL ENGAGEMENT

(71) Applicant: Raytheon Technologies Corporation, Farmington, CT (US)

(72) Inventors: Brian F. Hilbert, Coventry, CT (US); Mani Sadeghi, Glastonbury, CT (US); Daniel L. Gysling, South Glastonbury, CT (US); Kerwin R. Low, Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 93 days.

(21) Appl. No.: 17/000,815

(22) Filed: Aug. 24, 2020

(65) Prior Publication Data

US 2021/0054938 A1 Feb. 25, 2021

Related U.S. Application Data

(60) Provisional application No. 62/891,041, filed on Aug. 23, 2019.

(51) Int. Cl.
| | | |
|---|---|---|
| *F16J 15/447* | (2006.01) | |
| *F01D 11/02* | (2006.01) | |
| *F16J 15/44* | (2006.01) | |

(52) U.S. Cl.
CPC ......... *F16J 15/4472* (2013.01); *F01D 11/025* (2013.01); *F16J 15/442* (2013.01); *F05D 2220/30* (2013.01); *F05D 2240/55* (2013.01)

(58) Field of Classification Search
CPC .. F16J 15/00; F16J 15/44; F16J 15/442; F16J 15/4478; F16J 15/4472; F16J 15/4474; F16J 15/4476; F01D 11/00; F01D 11/02; F01D 11/025; F01D 11/08; F05D 2220/00; F05D 2220/30; F05D 2220/31; F05D 2220/32; F05D 2220/321; F05D 2220/3212–3213; F05D 2220/3215–3219; F05D 2240/55
USPC ......................................................... 277/412
See application file for complete search history.

(56) References Cited

U.S. PATENT DOCUMENTS

| | | | | |
|---|---|---|---|---|
| 6,428,009 B2* | 8/2002 | Justak | ................... | F16J 15/3288 277/355 |
| 7,182,345 B2* | 2/2007 | Justak | ..................... | F01D 11/00 277/355 |
| 7,410,173 B2* | 8/2008 | Justak | ..................... | F01D 11/00 277/355 |
| 7,896,352 B2* | 3/2011 | Justak | ................... | F16J 15/442 277/411 |

(Continued)

FOREIGN PATENT DOCUMENTS

WO    2020167129 A1    8/2020

OTHER PUBLICATIONS

EP search report for EP20192505.4 dated Jan. 14, 2021.

*Primary Examiner* — Nathan Cumar
(74) *Attorney, Agent, or Firm* — Getz Balich LLC

(57) ABSTRACT

An assembly is provided for rotational equipment. This assembly includes a stationary structure, a rotating structure rotatable about an axial centerline, and a non-contact seal assembly. The non-contact seal assembly is configured to substantially seal a gap between the stationary structure and the rotating structure. The non-contact seal assembly includes a seal shoe configured to sealingly engage the rotating structure axially along the axial centerline.

18 Claims, 11 Drawing Sheets

(56) References Cited

U.S. PATENT DOCUMENTS

| | | | |
|---|---|---|---|
| 8,002,285 B2* | 8/2011 | Justak | F16J 15/442 277/412 |
| 8,172,232 B2* | 5/2012 | Justak | F16J 15/442 277/411 |
| 8,641,045 B2* | 2/2014 | Justak | F01D 11/025 277/412 |
| 8,740,225 B2* | 6/2014 | Patterson | F01D 11/02 277/413 |
| 8,820,752 B2* | 9/2014 | Garrison | F16J 15/441 277/585 |
| 8,919,781 B2* | 12/2014 | Justak | F16J 15/442 277/411 |
| 9,115,810 B2* | 8/2015 | Bidkar | F16J 15/442 |
| 10,030,531 B2* | 7/2018 | Peters | F01D 9/02 |
| 10,184,347 B1* | 1/2019 | D'Ambruoso | F16J 15/447 |
| 2007/0120327 A1 | 5/2007 | Justak | |
| 2007/0253809 A1* | 11/2007 | Glynn | F01D 11/04 415/174.2 |
| 2008/0100000 A1 | 5/2008 | Justak | |
| 2008/0246223 A1 | 10/2008 | Justak | |
| 2008/0265513 A1 | 10/2008 | Justak | |
| 2009/0033037 A1* | 2/2009 | Varanasi | F01D 11/10 277/355 |
| 2011/0121519 A1 | 5/2011 | Justak | |
| 2011/0150640 A1* | 6/2011 | Tiemann | F01D 11/02 415/191 |
| 2011/0309585 A1* | 12/2011 | Uehara | F16J 15/445 277/352 |
| 2013/0234399 A1 | 9/2013 | Justak | |
| 2013/0259660 A1 | 10/2013 | Dale | |
| 2014/0252721 A1 | 9/2014 | Gore | |
| 2015/0285152 A1* | 10/2015 | Hayford | F01D 11/02 415/171.1 |
| 2015/0322816 A1* | 11/2015 | Schmitz | F01D 11/001 60/796 |
| 2015/0354391 A1* | 12/2015 | Li | F01D 11/001 415/173.1 |
| 2016/0069269 A1* | 3/2016 | Hyland | F01D 25/22 415/1 |
| 2016/0102570 A1* | 4/2016 | Wilson | F16F 15/06 277/411 |
| 2016/0108750 A1* | 4/2016 | Wilson | F01D 25/04 277/411 |
| 2016/0130963 A1* | 5/2016 | Wilson | F01D 11/025 60/805 |
| 2017/0009596 A1* | 1/2017 | Schwarz | F01D 11/02 |
| 2017/0051621 A1* | 2/2017 | Ackermann | F01D 11/122 |
| 2017/0051631 A1* | 2/2017 | Ackermann | F01D 11/001 |
| 2017/0051751 A1* | 2/2017 | Ackermann | F16J 15/442 |
| 2017/0211402 A1* | 7/2017 | Peters | F01D 11/025 |
| 2017/0211406 A1 | 7/2017 | Peters | |
| 2017/0226883 A1* | 8/2017 | Peters | F01D 5/02 |
| 2017/0248236 A1* | 8/2017 | Simpson | F16J 15/447 |
| 2018/0058240 A1* | 3/2018 | Chuong | F04D 29/321 |
| 2019/0093496 A1 | 3/2019 | Hardikar | |

\* cited by examiner

NON-CONTACT SEAL WITH AXIAL ENGAGEMENT

CROSS-REFERENCE TO RELATED APPLICATIONS

This application claims priority to U.S. Provisional Patent Application No. 62/891,041 filed Aug. 23, 2019, which is hereby incorporated herein by reference in its entirety.

BACKGROUND OF THE DISCLOSURE

1. Technical Field

This disclosure relates generally to a fluid seal and, more particularly, to a non-contact seal.

2. Background Information

Rotational equipment such as a gas turbine engine include various types of seal assemblies for blocking fluid leakage between elements. One such type of known seal assembly is a non-contact seal assembly. A typical non-contact seal assembly includes a seal element that sealingly interfaces with a seal land without touching the seal land during, for example, normal operation.

An adaptive non-contact seal assembly is intended to react to applied pressure boundary conditions, thermal-mechanical closures, and in general any transient excursions to maintain tight, near constant clearances with a rotor. The resulting overall leakage area reduction associated with such an adaptive seal assembly offers an engine performance benefit compared to a non-adaptive seal assembly. Some known adaptive seal assemblies rely on friction to mitigate aerodynamic instabilities. However, use of excessive friction in an adaptive seal assembly may limit its ability to adequately track the rotor under certain conditions. As a result, one or more elements of the adaptive seal assembly may contact the rotor, may be subject to excessive wear, and may lead to increased leakage through the seal assembly. There is a need in the art therefore for an improved non-contact seal assembly.

SUMMARY OF THE DISCLOSURE

According to an aspect of the present disclosure, an assembly is provided for rotational equipment. This assembly includes a stationary structure, a rotating structure and a non-contact seal assembly. The rotating structure is rotatable about an axial centerline. The non-contact seal assembly is configured to substantially seal an annular gap between the stationary structure and the rotating structure. The non-contact seal assembly includes a seal shoe configured to sealingly engage the rotating structure axially along the axial centerline.

According to another aspect of the present disclosure, another assembly is provided for rotational equipment. This assembly includes a seal carrier, a seal shoe and a plurality of flexible ligaments. The seal carrier extends circumferentially around an axial centerline. The seal shoe extends circumferentially around the axial centerline. The seal shoe projects axially into an annular channel in the seal carrier. The seal shoe is configured to sealingly engage a radially extending surface axially along the axial centerline. The flexible ligaments are arranged in an annular array within the annular channel. Each of the flexible ligaments extends radially between and is connected to the seal shoe and the seal carrier. The flexible ligaments enable axial and/or lateral shifting of the seal shoe relative to the seal carrier.

A first of the plurality of flexible ligaments may be axially tapered. In addition or alternatively, the first of the plurality of flexible ligaments may be laterally tapered.

The assembly may include a seal element projecting axially along the axial centerline out from the seal carrier and into a groove in the seal shoe such that the seal element and a portion of the seal shoe with the groove form a labyrinth seal.

The assembly may include a seal element projecting radially out from the seal carrier towards an axially extending surface of the seal shoe such that the seal element and a portion of the seal shoe with the axially extending surface form a knife-edge seal.

The non-contact seal assembly may be configured as a hydrostatic seal assembly.

The non-contact seal assembly may be an adapted non-contact seal assembly.

The seal shoe may be a monolithic full hoop body.

The seal shoe may include a seal shoe base and a seal shoe projection that projects axially along the axial centerline out from the seal shoe base towards the rotating structure.

The seal shoe may sealingly engage and may be axially adjacent a radially extending surface of the rotating structure. The radially extending surface of the rotating structure may have a first radial height. The seal shoe may have a second radial height that is less than or equal to the first radial height.

The radially extending surface of the rotating structure may be a planar surface.

The non-contact seal assembly may also include a seal carrier and a spring structure. The seal carrier may be mounted to the stationary structure. The spring structure may flexibly connect the seal shoe to the seal carrier.

The non-contact seal assembly may also include a second spring structure. The second spring structure may further flexibly connect the seal shoe to the seal carrier.

The spring structure and/or the second spring structure may each include a plurality of ligaments arranged in an annular array about the axial centerline. Each of the plurality of ligaments may extend radially out from the seal shoe to the seal carrier.

A first of the plurality of flexible ligaments may be axially tapered. In addition or alternatively, the first of the plurality of flexible ligaments may be circumferentially tapered.

The non-contact seal assembly may also include a seal carrier mounted to the stationary structure. The seal shoe may be coupled to the seal carrier. The seal shoe may be configured to axially and/or circumferentially shift relative to the seal carrier.

The non-contact seal assembly may also include a seal carrier and a seal element. The seal carrier may be mounted to the stationary structure. The seal element may project axially along the axial centerline out from the seal carrier and into a groove in the seal shoe such that the seal element and a portion of the seal shoe with the groove form a labyrinth seal.

The non-contact seal assembly may also include a seal carrier and a seal element. The seal carrier may be mounted to the stationary structure. The seal element may project radially out from the seal carrier towards an axially extending surface of the seal shoe such that the seal element and a portion of the seal shoe with the axially extending surface form a knife-edge seal.

The non-contact seal assembly may also include a seal carrier and a plurality of ligaments arranged in an annular array. The seal carrier may be mounted to the stationary structure. The plurality of ligaments may extend between and couple the seal shoe and the seal carrier. The seal shoe may project axially along the axial centerline into a channel in the seal carrier.

The non-contact seal assembly may also include a seal carrier and a plurality of ligaments that extend radially between and couple the seal shoe and the seal carrier. The seal carrier may be mounted to the stationary structure. At least the seal shoe, the seal carrier and the plurality of ligaments may be configured as a monolithic body.

The foregoing features and the operation of the invention will become more apparent in light of the following description and the accompanying drawings.

DETAILED DESCRIPTION

Figure 1:
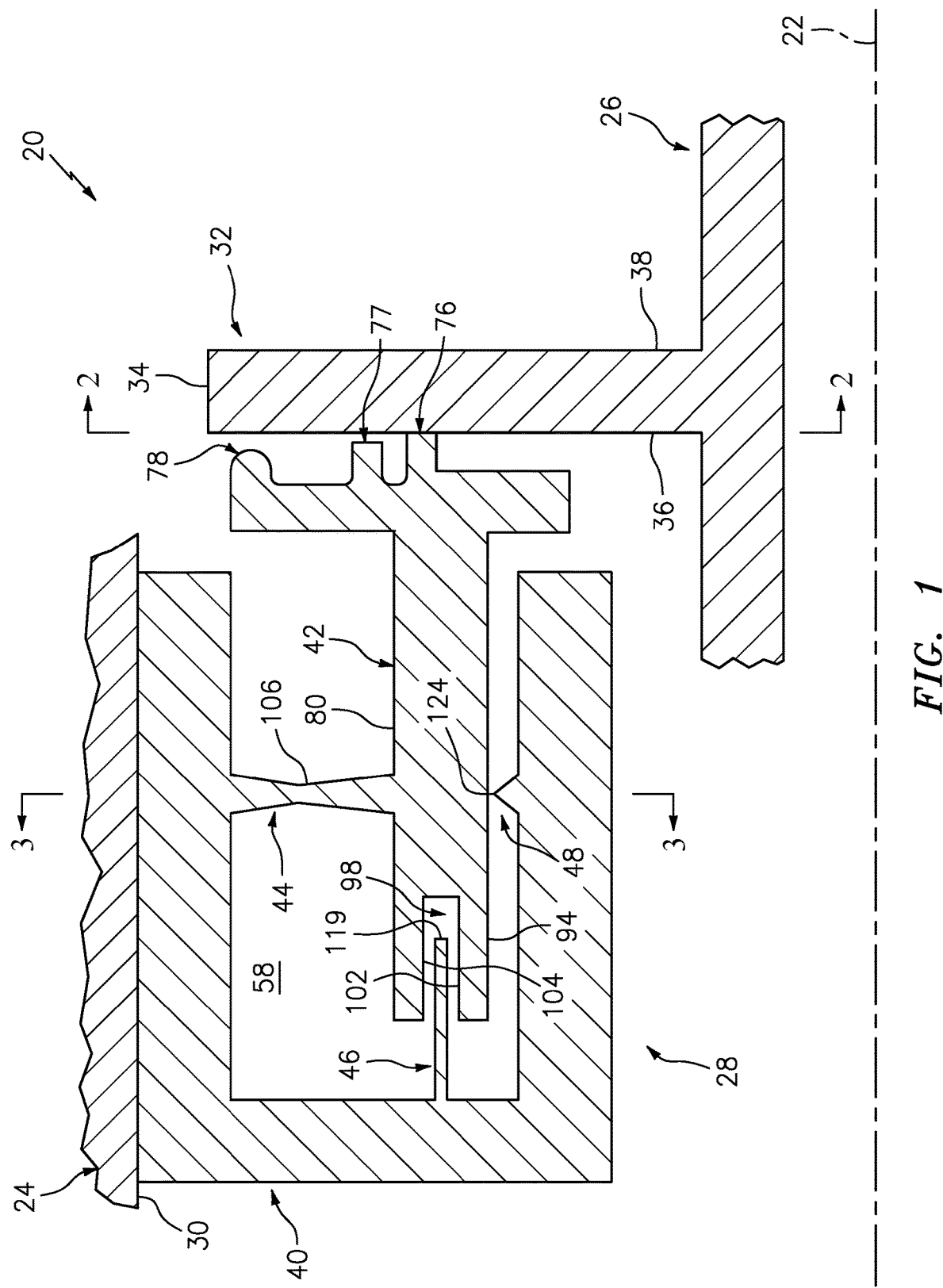
FIG. 1 is a partial side sectional illustration of an assembly for rotational equipment.

FIG. 1 illustrates an assembly 20 for rotational equipment with an axial centerline 22, which axial centerline 22 may also be an axis of rotation (e.g., a rotational axis) for one or more components of the assembly 20. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a stationary structure and a rotating structure; e.g., a rotor.

The assembly 20 of FIG. 1 includes a stationary structure 24, a rotating structure 26 and an adaptive non-contact seal assembly 28; e.g., a hydrostatic (e.g., hydrodynamic) seal assembly. The seal assembly 28 is mounted with the stationary structure 24 and configured to substantially seal an annular gap between the stationary structure 24 and the rotating structure 26 as described below in further detail. Furthermore, in contrast to prior art seal assemblies, the seal assembly 28 may also be configured such that friction does not significantly adversely impact adaptability of the seal assembly 28 and, thus, does not significantly negatively impact seal performance or seal life as described below in further detail.

The stationary structure 24 has an inner radial stationary structure surface 30. This stationary structure surface 30 may be substantially cylindrical, and extends circumferentially around and faces towards the axial centerline 22. The stationary structure surface 30 at least partially forms a bore in the stationary structure 24. This bore is sized to receive the seal assembly 28, which may be fixedly mounted to the stationary structure 24 by, for example, a press fit connection between the seal assembly 28 and the stationary structure surface 30. The seal assembly 28, of course, may also or alternatively be fixedly attached to the stationary structure 24 using one or more other techniques/devices.

Figure 2:
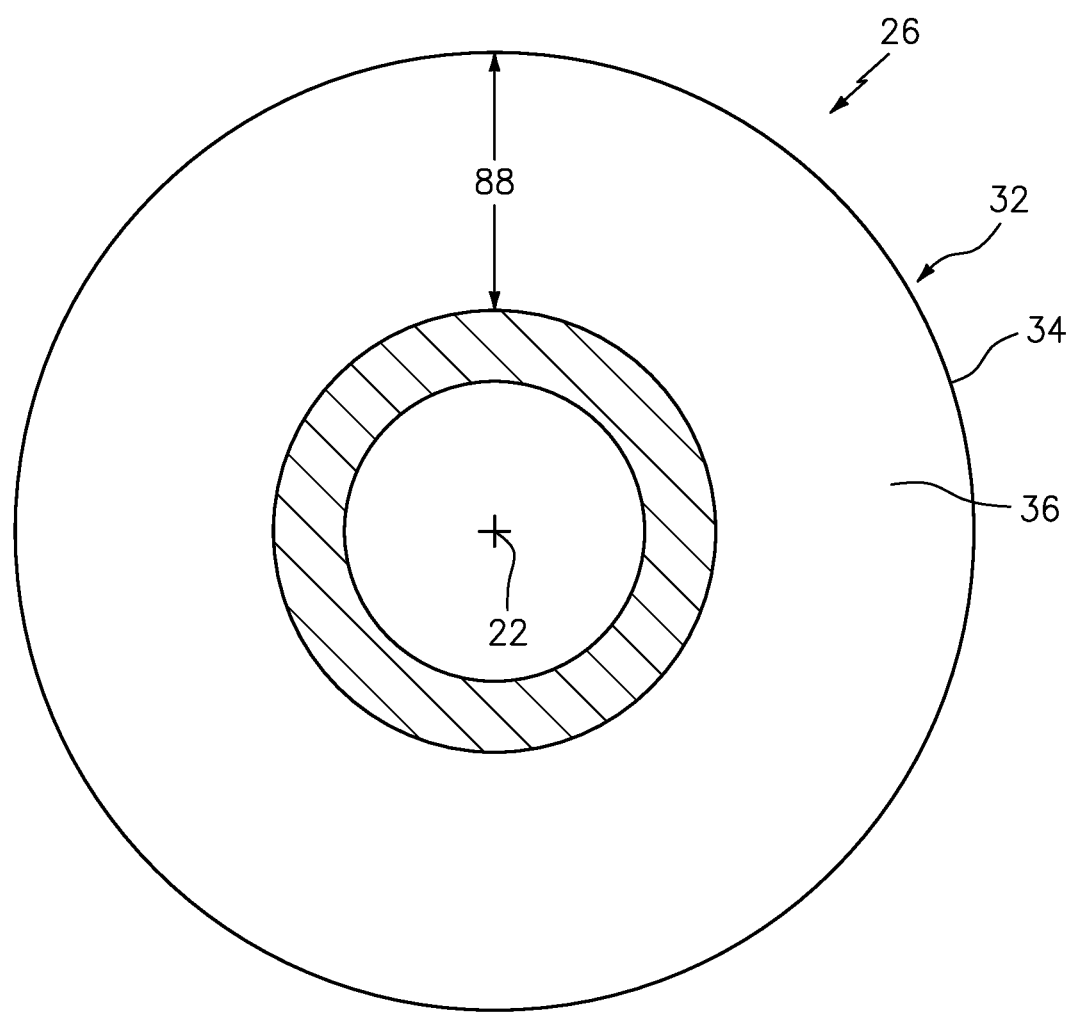
FIG. 2 is a cross-sectional illustration of a rotating structure taken along line 2-2 in FIG. 1.

The rotating structure 26 includes a seal land 32. This seal land 32 may be a discrete, unitary annular body. Alternatively, the seal land 32 may be configured with another component/portion (e.g., a shaft) of the rotating structure 26 as shown in FIG. 1. The seal land 32 has an outer seal land surface 34, which extends axially between opposing first and second seal land side surfaces 36 and 38. The first seal land side surface 36 is a radially extending surface, which may be exactly or substantially (e.g., within +/−1 degree) perpendicular to the axial centerline 22. The first seal land side surface 36 of FIG. 2 is circumferentially and/or radially uninterrupted. The first seal land side surface 36, for example, extends circumferentially around the axial centerline 22 and/or radially between opposing edges of the surface 36 without any breaks; e.g., apertures and/or protrusions. The present disclosure, of course, is not limited to such an exemplary first seal land side surface 36. For example, in other embodiments, the first seal land side surface 36 may be circumferentially and/or radially interrupted by one or more apertures (e.g., grooves) and/or projections (e.g., ribs). Referring again to FIG. 1, the first seal land side surface 36 may be an annular, planar (e.g., flat) surface.

Figure 1B:
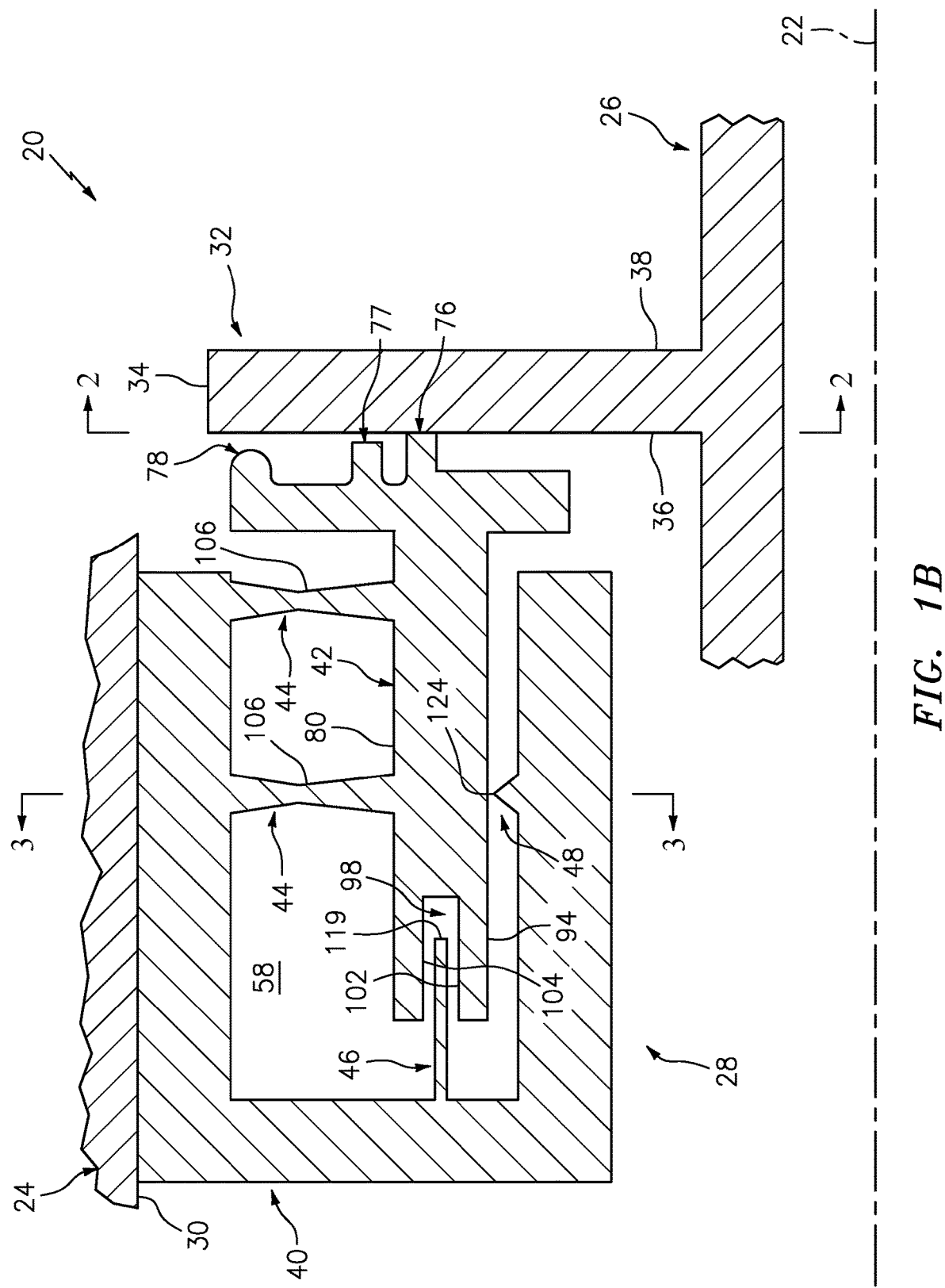
FIG. 1B is a partial side sectional illustration of the rotational equipment assembly configured with an additional spring structure.
Figure 3:
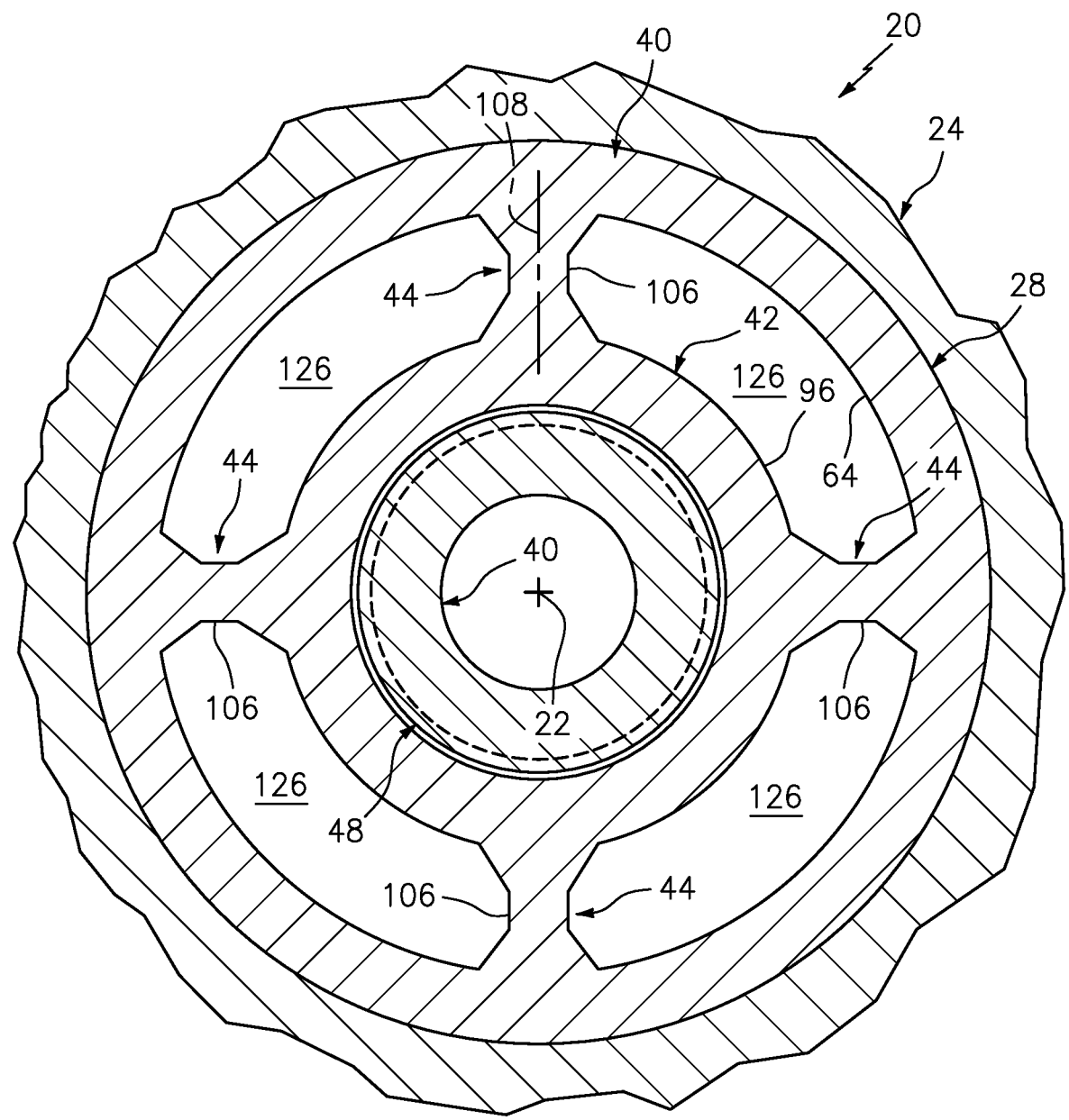
FIG. 3 is a cross-sectional illustration of a stationary structure and a seal assembly taken along line 3-3 in FIG. 1.

The seal assembly 28 of FIGS. 1 and 3 includes a seal carrier 40, a seal shoe 42 and a spring structure 44 (or a plurality of spring structures 44 as shown in FIG. 1B). The seal assembly 28 of FIGS. 1 and 3 may also include one or more secondary seal elements 46 and 48.

Figure 4:
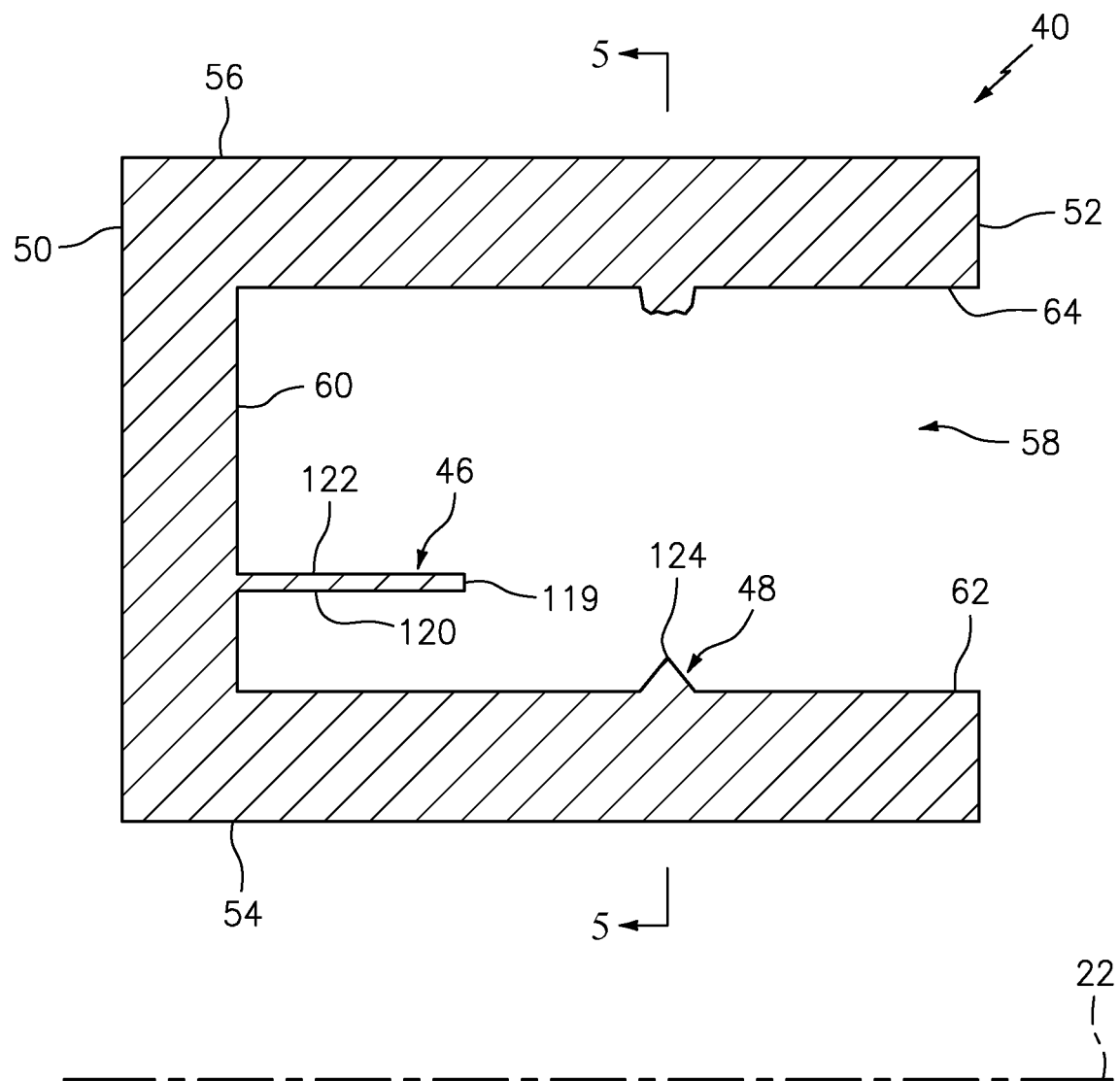
FIG. 4 is a partial side sectional illustration of the seal assembly shown without a spring structure and a seal shoe for ease of depiction.
Figure 5:
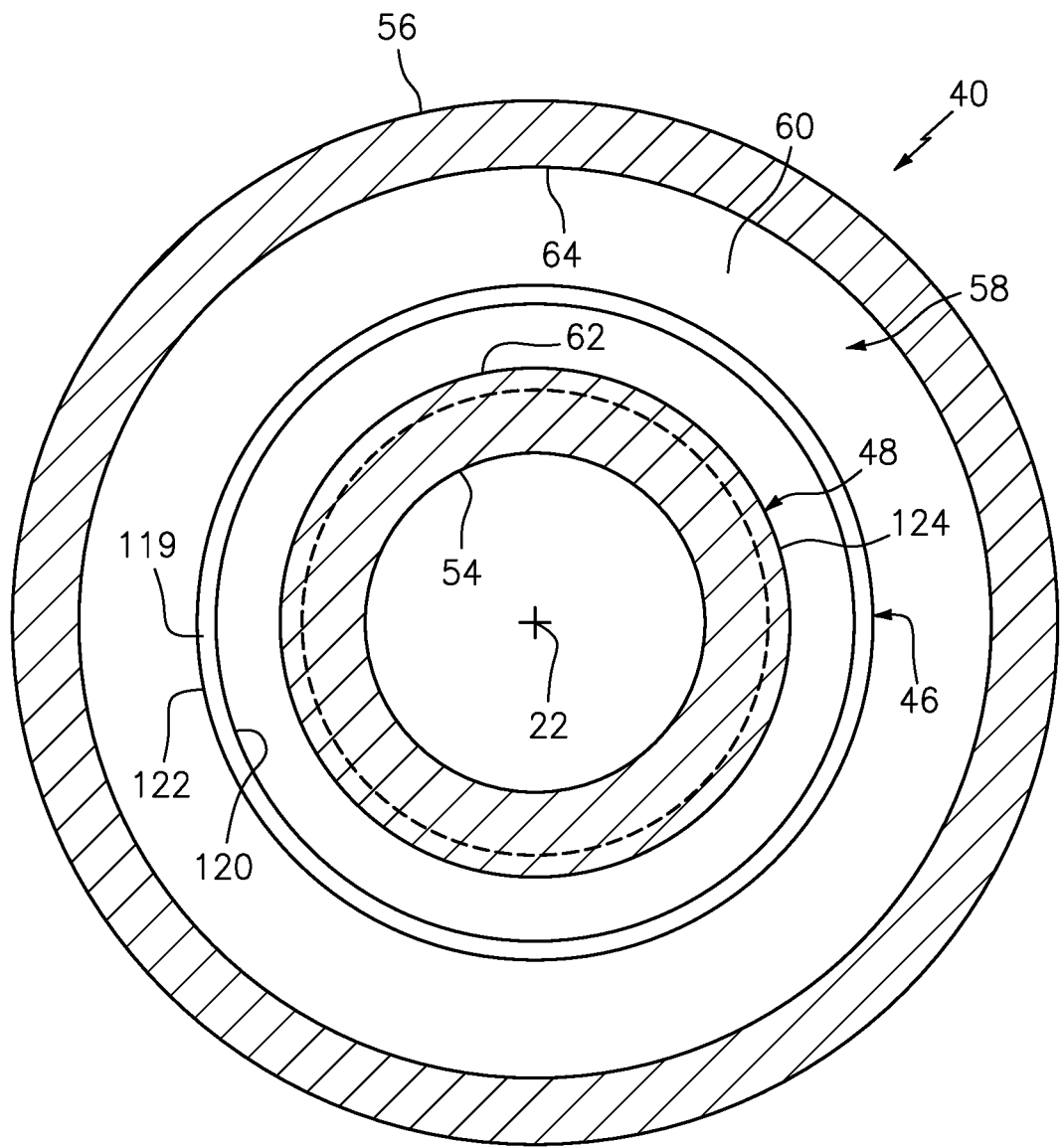
FIG. 5 is a cross-sectional illustration of the assembly of FIG. 4 taken along line 5-5 in FIG. 4.

Referring to FIGS. 4 and 5, the seal carrier 40 extends circumferentially around the axial centerline 22 thereby providing the seal carrier 40 with a full hoop (e.g., monolithic) body. The seal carrier 40 extends axially along the axial centerline 22 between a first seal carrier side 50 and a second seal carrier side 52. The seal carrier 40 extends radially between an inner seal carrier side 54 and an outer seal carrier side 56.

The seal carrier 40 is configured with a (e.g., annular) channel 58 and may thereby have a C-shaped side sectional geometry. This channel 58 extends circumferentially through the seal carrier 40 around the axial centerline 22. The channel 58 extends axially into the seal carrier 40 from the second seal carrier side 52 to a channel end surface 60, which surface 60 extends radially between inner and outer channel side surfaces 62 and 64. The channel 58 extends radially within the seal carrier 40 between the inner and the outer channel side surfaces 62 and 64. The inner channel side surface 62 extends axially along the axial centerline 22 from the second seal carrier side 52 to the channel end surface 60. The outer channel side surface 64 extends axially along the axial centerline 22 from the second seal carrier side 52 to the channel end surface 60. The inner and the outer channel side surfaces 62 and 64 may each be exactly or substantially (e.g., within +/−1 degree) parallel to the axial centerline 22.

Figure 6:
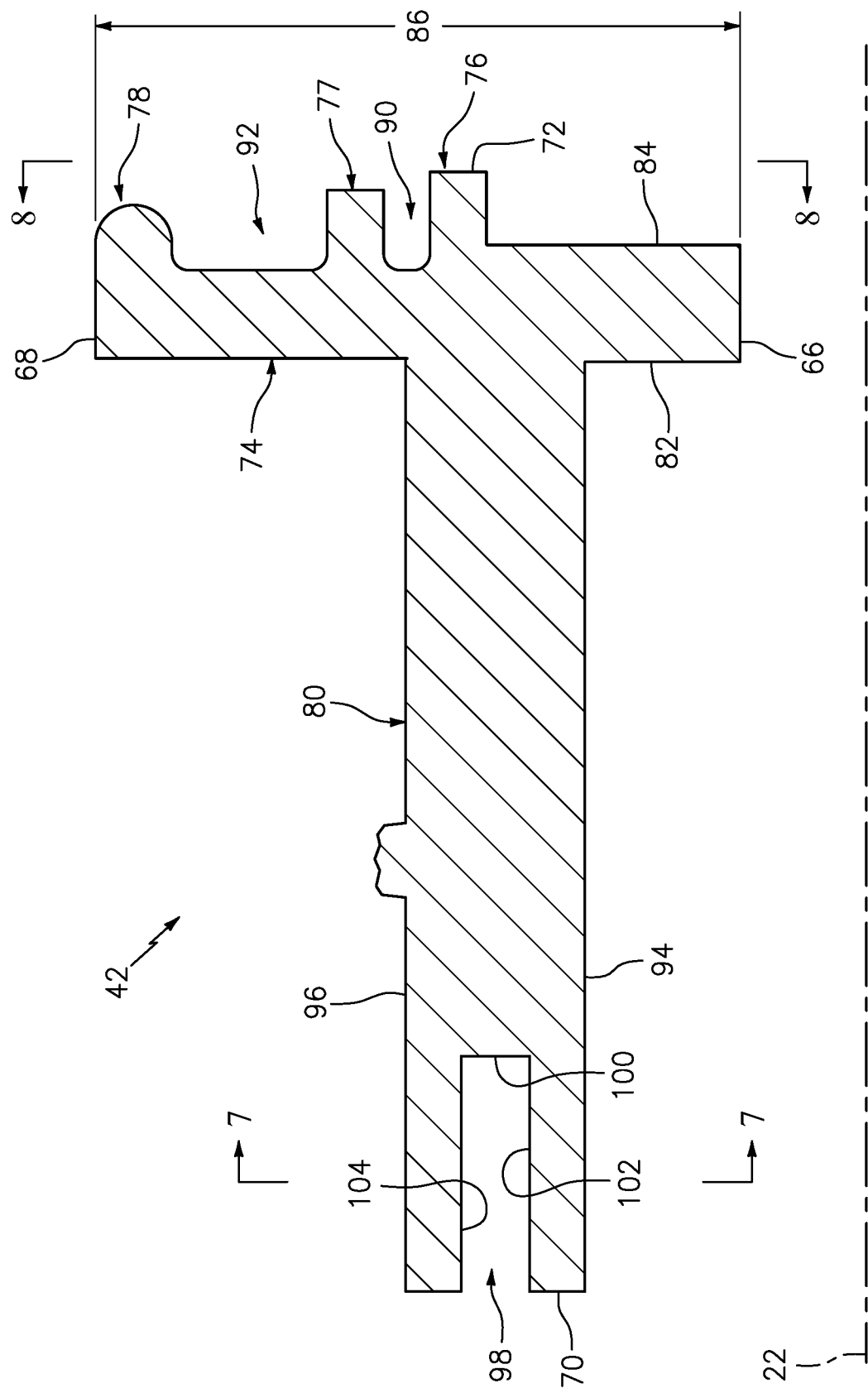
FIG. 6 is a partial side sectional illustration of the seal shoe.
Figure 7:
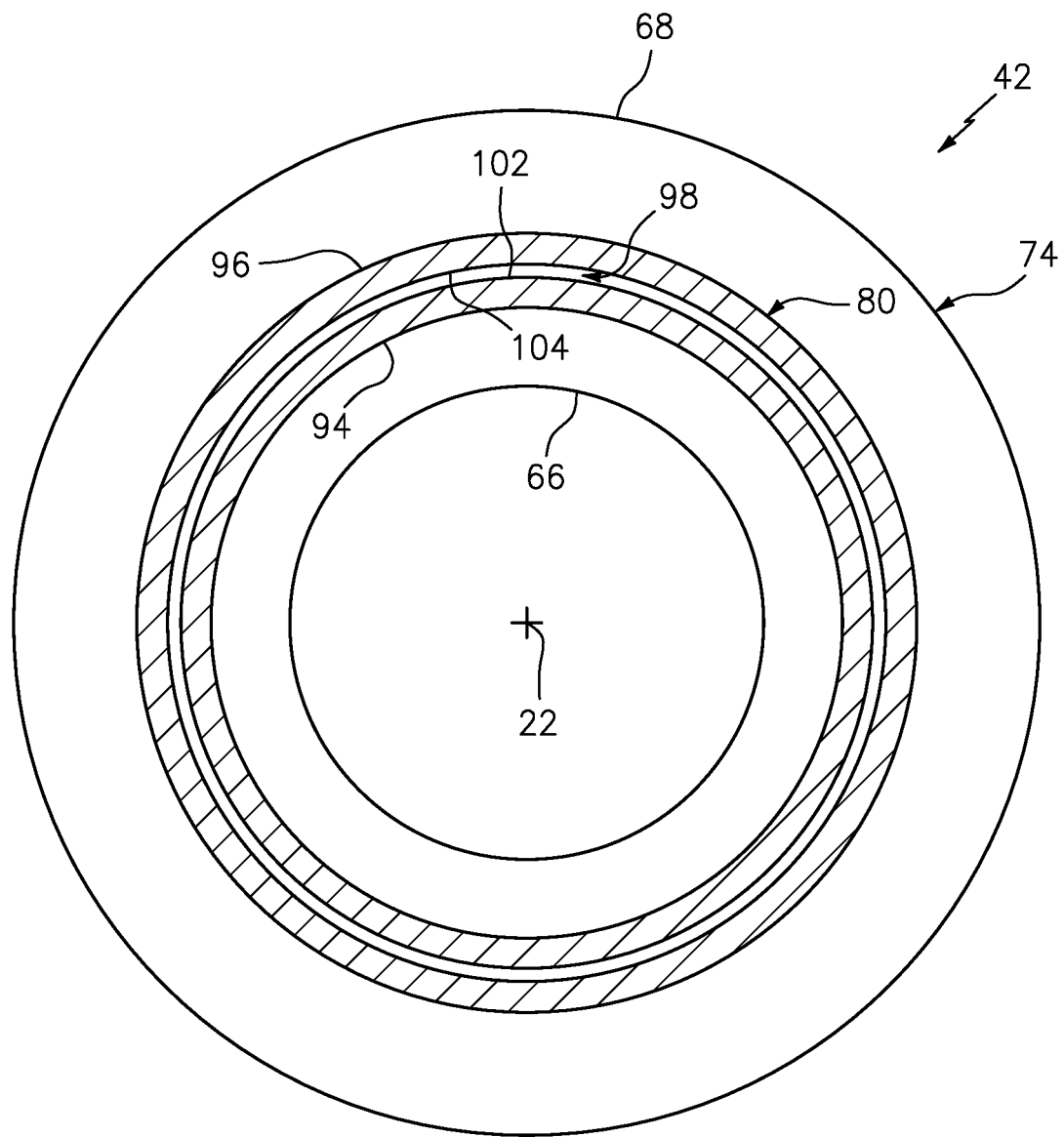
FIG. 7 is a cross-sectional illustration of the seal shoe taken along line 7-7 in FIG. 6.
Figure 8:
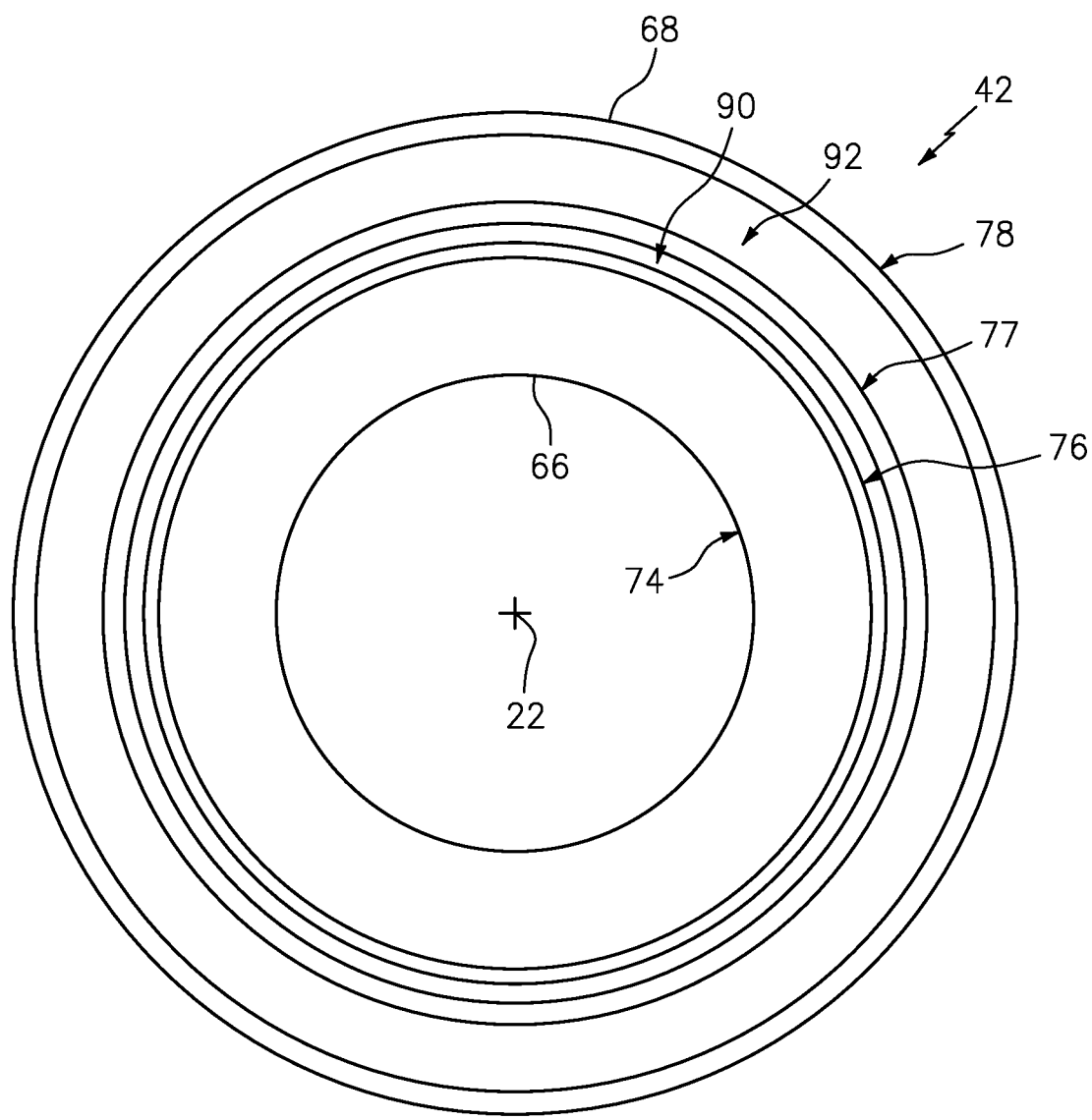
FIG. 8 is an end view illustration of the seal shoe taken along line 8-8 in FIG. 6.

Referring to FIGS. 6-8, the seal shoe 42 extends circumferentially around the axial centerline 22 thereby providing the seal shoe 42 with a full hoop (e.g., monolithic) body. The seal shoe 42 extends radially between an inner seal shoe side 66 and an outer seal shoe side 68. The seal shoe 42 extends axially between a first seal shoe side 70 and a second seal shoe side 72. The seal shoe 42 includes a seal shoe base 74, one or more seal shoe projections 76-78 (e.g., ridges) and a seal shoe flange 80.

The seal shoe base 74 extends circumferentially around the axial centerline 22. The seal shoe base 74 extends radially from the inner seal shoe side 66 to the outer seal shoe side 68. The seal shoe base 74 is disposed at (e.g., on, adjacent or proximate) the second seal shoe side 72, and extends axially between opposing seal shoe base surfaces 82 and 84.

The seal shoe base 74 has a radial height 86 (see FIG. 6), which is defined between the inner seal shoe side 66 and the outer seal shoe side 68. This radial height 86 may be equal to or less than a radial height 88 of the first seal land side surface 36; see FIG. 2.

The seal shoe projections 76-78 are disposed at the second seal shoe side 72. Each of the seal shoe projections 76-78, for example, projects axially along the axial centerline 22 out from the second seal shoe base surface 84 to a respective distal end. Each of the seal shoe projections 76-78 may be configured as an annular ridge; e.g., see FIG. 8. Each of the seal shoe projections 76-78, for example, extends circumferentially around the axial centerline 22. The seal shoe projection 77 is arranged radially between the seal shoe projections 76 and 78, and radially spaced from each of those projections 76 and 78 by a respective (e.g., annular) groove 90, 92 in the seal shoe 42. The seal shoe projection 78 is disposed at the outer seal shoe side 68. The seal shoe projection 76 is disposed approximately radially midway between the inner and the outer seal shoe sides 66 and 68. The seal shoe 42 of the present disclosure, however, is not limited to the number, configurations and/or locations of the foregoing exemplary seal shoe projections 76-78.

The seal shoe flange 80 extends circumferentially around the axial centerline 22. The seal shoe flange 80 extends radially between inner and outer flange side surfaces 94 and 96. The seal shoe flange 80 and, for example, its surfaces 94 and 96 project axially along the axial centerline 22 out from the seal shoe base 74 to a distal end at the first seal shoe side 70. The inner and the outer flange side surfaces 94 and 96 may each be exactly or substantially (e.g., within +/−1 degree) parallel to the axial centerline 22.

The seal shoe flange 80 is configured with a (e.g., annular) groove 98 and may thereby have an end portion with a C-shaped side sectional geometry. This groove 98 extends circumferentially through the seal shoe flange 80 about the axial centerline 22. The groove 98 extends axially into the seal shoe flange 80 from the first seal shoe side 70 to a groove end surface 100, which surface 100 extends radially between inner and outer groove side surfaces 102 and 104. The groove 98 extends radially within the seal shoe flange 80 between the inner and the outer groove side surfaces 102 and 104. The inner groove side surface 102 extends axially along the axial centerline 22 from the first seal shoe side 70 to the groove end surface 100. The outer groove side surface 104 extends axially along the axial centerline 22 from the first seal shoe side 70 to the groove end surface 100. The inner and the outer groove side surfaces 102 and 104 may each be exactly or substantially (e.g., within +/−1 degree) parallel to the axial centerline 22. Each of the inner and the outer groove side surfaces 102 and 104 may be a cylindrical surface, which may be circumferentially and/or axially uninterrupted.

Referring to FIG. 3, each spring structure 44 may include one or more (e.g., flexible/compliant) ligaments 106; e.g., columnar members. These ligaments 106 are arranged circumferentially about the axial centerline 22 in an annular array. Each of the ligaments 106 is connected to and extends radially between the seal shoe 42 and the seal carrier 40. In particular, each ligament 106 of FIG. 3 projects radially out from the outer flange side surface 96 to the outer channel side surface 64. A centerline 108 of each ligament 106 may be exactly or substantially (e.g., within +/−1 degree) perpendicular to the axial centerline 22; however, the present disclosure is not limited thereto.

Figure 10:
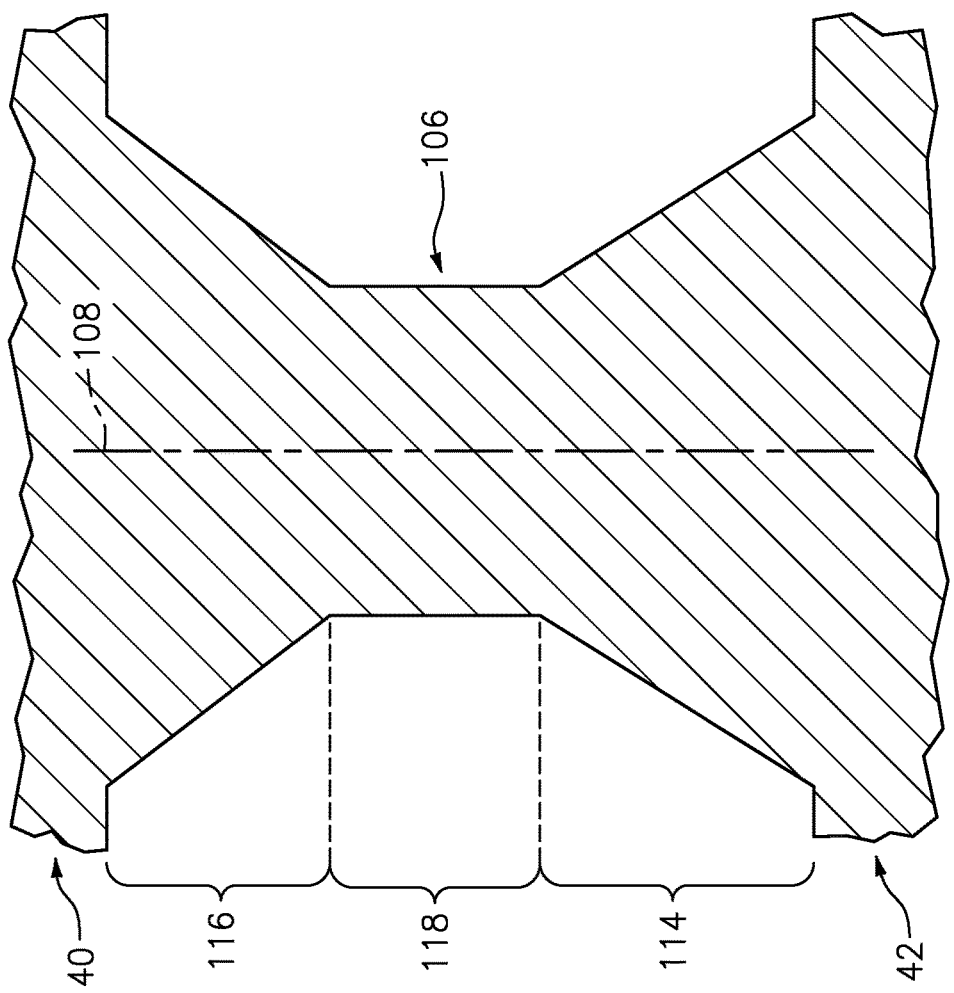
FIG. 10 is a cross-sectional illustration of the spring structure ligament extending between the seal carrier and the seal shoe.
Figure 9:
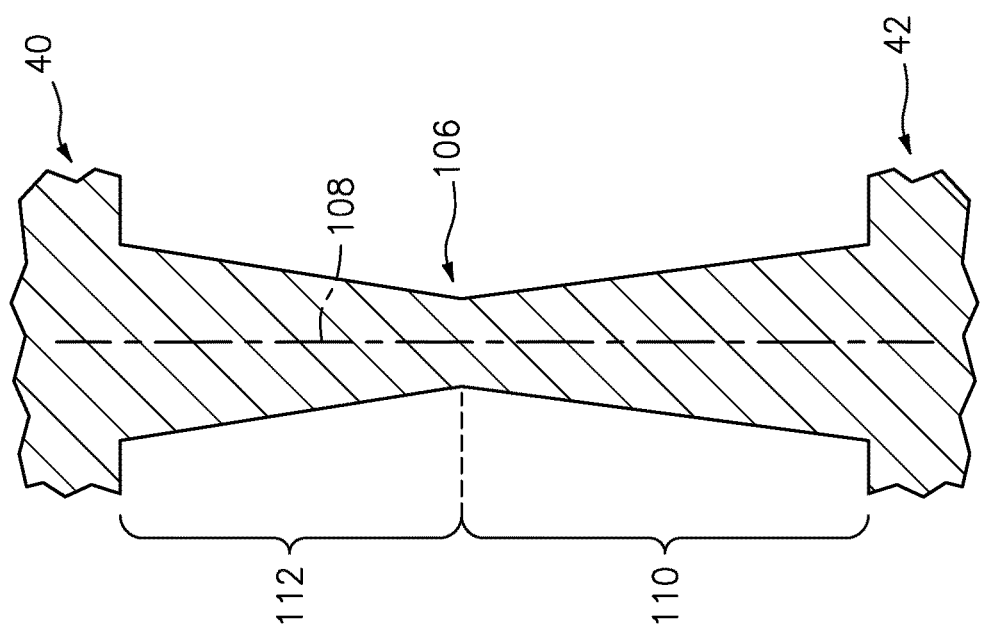
FIG. 9 is a side sectional illustration of a spring structure ligament extending between the seal carrier and the seal shoe.

Referring to FIGS. 9 and 10, each ligament 106 may taper as that ligament 106 extends radially. For example, an inner portion 110 of the ligament 106 of FIG. 9 axially tapers as that inner portion 110 extends radially outward from the seal shoe 42 towards the seal carrier 40. Similarly, an outer portion 112 of the ligament 106 of FIG. 9 axially tapers as that outer portion 112 extends radially inward from the seal carrier 40 towards the seal shoe 42. The inner and the outer portions 110 and 112 may meet at a radially intermediate location along the ligament 106. Alternatively, the inner and the outer portions 110 and 112 may be separated by an intermediate portion of the ligament 106; e.g., similar to lateral taper of FIG. 10. Referring again to FIG. 9, the axial taper of the inner and/or the outer portions 110 and 112 may be symmetrical about the centerline 108; however, the present disclosure is not limited thereto.

Referring now to FIG. 10, another inner portion 114 of the ligament 106 may also or alternatively laterally (e.g., circumferentially) taper as that inner portion 114 extends radially outward from the seal shoe 42 towards the seal carrier 40. Similarly, another outer portion 116 of the ligament 106 of FIG. 9 may also or alternatively laterally taper as that outer portion 116 extends radially inward from the seal carrier 40 towards the seal shoe 42. The inner and the outer portions 114 and 116 may be separated by an intermediate portion 118 of the ligament 106, which portion 118 may not be laterally tapered. Alternatively, the inner and the outer portions 114 and 116 may meet at a radially intermediate location along the ligament 106; e.g., similar to axial taper of FIG. 9. Referring again to FIG. 10, the lateral taper of the inner and/or the outer portions 114 and 116 may be symmetrical about the centerline 108; however, the present disclosure is not limited thereto.

Referring to FIG. 1, the ligaments 106 and, thus, each spring structure 44 (e.g., flexibly/compliantly) couples the seal shoe 42 to the seal carrier 40 such that at least a portion of the seal shoe flange 80 is axially within the channel 58. Each of the ligaments 106 is configured to flex (e.g., elastically deform) during certain modes of operation. This flexure may enable the seal shoe 42 to slightly shift (e.g., slide and/or rotate) relative to the seal land 32 during operation. For example, the ligaments 106 may enable the seal shoe 42 to shift axially (e.g., axially translate) along the axial centerline 22. The ligaments 106 may also or alternatively enable the seal shoe 42 to shift circumferentially (e.g., rotate) about the axial centerline 22. Such shifting may enable the seal assembly 28 to accommodate vibrations, pressure changes, etc. during operation. The shifting may also or alternatively enable a hydrostatic non-contact seal interface to be formed between the seal shoe 42 and its protrusions 76-78 and the first seal land side surface 36.

In the embodiment of FIG. 1B, the spring structures 44 are axially spaced from one another by an axial distance/an axial gap. With such a configuration, the spring structures 44 may further maintain axial alignment of the seal shoe 42 with the seal land 32.

Referring to FIGS. 4 and 5, the secondary seal element 46 may be configured as a diving board seal element. The secondary seal element 46 of FIGS. 4 and 5, for example, extends circumferentially around the axial centerline 22. The secondary seal element 46 projects axially along the axial centerline 22 out from the channel end surface 60 to a distal seal element end 119. The secondary seal element 46 extends radially between inner and outer seal element surfaces 120 and 122. The inner and the outer seal element surfaces 120 and 122 may each be exactly or substantially (e.g., within +/−1 degree) parallel to the axial centerline 22. Each of the inner and the outer seal element surfaces 120 and 122 may be a cylindrical surface, which may be circumferentially and/or axially uninterrupted. Referring to FIG. 1, the distal seal element end 119 is disposed within the groove 98. The secondary seal element 46, for example, projects axially out from the seal carrier 40 and into the groove 98 so as to form a labyrinth seal with a portion of the seal shoe 42 that includes the groove 98.

While the secondary seal element 46 and the seal shoe form a labyrinth seal, under certain conditions, the secondary seal element 46 may also touch (e.g., contact) one of the groove surfaces 102 and 104; e.g., the surface 104. Such contact may enable the secondary seal element 46 to damp vibrations in the seal shoe 42. The secondary seal element 46 may thereby also be configured as a mechanical seal shoe damper.

Referring again to FIGS. 4 and 5, the secondary seal element 48 may be configured as a knife edge seal element. The secondary seal element 48 of FIGS. 4 and 5, for example, extends circumferentially around the axial centerline 22. The secondary seal element 48 projects radially outwards from the inner channel side surface 62 to a relatively sharp distal edge 124; e.g., a knife edge. More particularly, the secondary seal element 48 may axially taper as the element 48 extends from the seal carrier 40 to its distal edge 124. Referring to FIG. 1, the distal edge 124 is positioned in close proximity to (e.g., next to but slightly spaced from, or alternatively touching) the inner flange side surface 94 so as to form a knife edge seal with a portion of the seal shoe 42 that includes the surface 94.

During operation of the assembly of FIG. 1, the rotating structure 26 rotates about the axial centerline 22. When the rotating structure 26 is static and/or rotating a relatively low speeds (e.g., the structure 26 just starts rotating), the seal shoe 42 and one or more of its protrusions 76-78 (e.g., the protrusion 76)) may contact or be in close proximity to the seal land 32 and its surface 36. However, as the speed of the rotating structure 26 increases, the gap between the seal shoe 42 and the seal land 32 may increase as, for example, a hydrodynamic seal is formed between the seal shoe 42 and the seal land 32. While this seal between the seal shoe 42 and the seal land 32 blocks a majority of fluid leakage between the structures 24 and 26, additional fluid leakage that could otherwise pass through apertures 126 defined circumferentially between the ligaments 106 (see FIG. 3) is blocked by one or both of the secondary seal elements 46 and 48. The seal assembly 28 thereby may substantially seal the gap between the stationary structure 24 and the rotating structure 26.

In addition to reducing fluid leakage through the apertures 126, the secondary seal element 48 also serves to reduce a pressure drop across the secondary seal element 46. As a result, a pressure forces pressing the secondary seal element 46 against the seal shoe 42 may be much smaller than if the secondary seal element 48 was omitted. This smaller pressure force results in provision of a relatively small friction force between the secondary seal element 46 and the seal shoe 42. Maintaining this friction force small may ensure the seal shoe 42 can freely move (e.g., axially translate) relative to the secondary seal element 46 and, thus, reducing the impact of friction on adaptability of the seal assembly 28.

In some embodiments, one or more or each of the seal assembly elements 40, 42, 44, 46 and/or 48 may be configured together in a monolithic body. Herein, the term "monolithic" may describe a component which is formed as a single unitary body. For example, the seal assembly elements 40, 42, 44, 46 and/or 48 may be cast, additively manufactured and/or otherwise forms as a single mass of material. In another example, the seal assembly elements 40, 42, 44, 46 and/or 48 may be discretely formed and subsequently permanently welded and/or otherwise bonded together to form a single unitary body. By contrast, a non-monolithic body includes, for example, discretely formed bodies which are then mechanically and/or otherwise removably fastened together.

Figure 11:
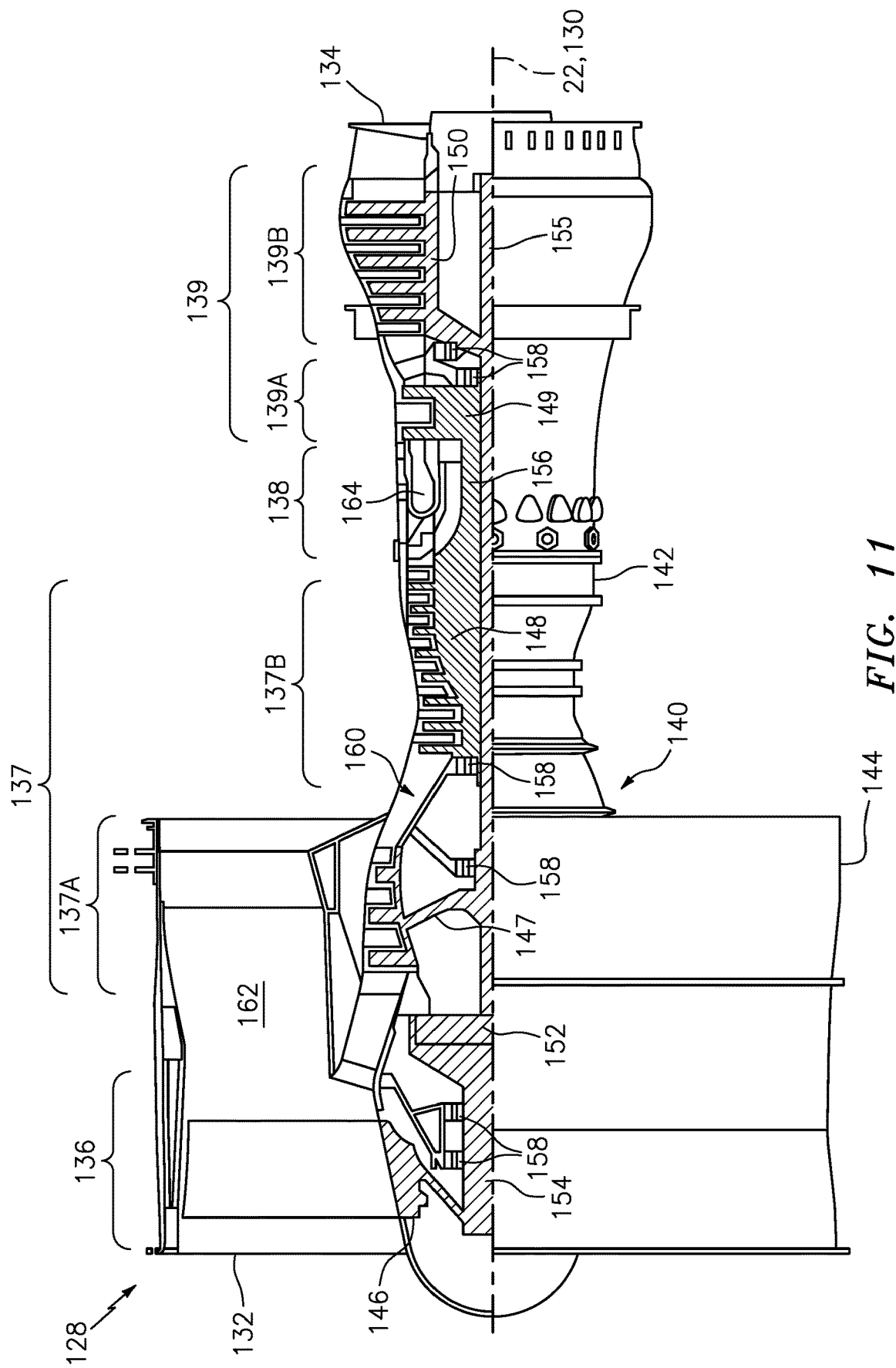
FIG. 11 is a side cutaway illustration of a geared turbofan gas turbine engine.

FIG. 11 is a side cutaway illustration of a geared turbine engine 128 with which the assembly 20 of FIG. 1 may be configured. This turbine engine 128 extends along an axial centerline 130 (e.g., the axial centerline 22 of the assembly 20) between an upstream airflow inlet 132 and a downstream airflow exhaust 134. The turbine engine 128 includes a fan section 136, a compressor section 137, a combustor section 138 and a turbine section 139. The compressor section 137 includes a low pressure compressor (LPC) section 137A and a high pressure compressor (HPC) section 137B. The turbine section 139 includes a high pressure turbine (HPT) section 139A and a low pressure turbine (LPT) section 139B.

The engine sections 136-139 are arranged sequentially along the centerline 130 within an engine housing 140, which may include the stationary structure 24 of FIG. 1. The housing 140 includes an inner case 142 (e.g., a core case) and an outer case 144 (e.g., a fan case). The inner case 142 may house one or more of the engine sections 137-139; e.g., an engine core. The outer case 144 may house at least the fan section 136.

Each of the engine sections 136, 137A, 137B, 139A and 139B includes a respective rotor 146-150. Each of these rotors 146-150 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 146 is connected to a gear train 152, for example, through a fan shaft 154. The gear train 152 and the LPC rotor 147 are connected to and driven by the LPT rotor 150 through a low speed shaft 155. The HPC rotor 148 is connected to and driven by the HPT rotor 149 through a high speed shaft 156. Any one of these shafts 154-156 may be included in or otherwise connected to/rotatable with the rotating structure 26 of FIG. 1. Referring again to FIG. 11, the shafts 154-156 are rotatably supported by a plurality of bearings 158; e.g., rolling element and/or thrust bearings.

Each of these bearings 158 is connected to the engine housing 140 by at least one stationary structure such as, for example, an annular support strut.

During operation, air enters the turbine engine 128 through the airflow inlet 132. This air is directed through the fan section 136 and into a core gas path 160 and a bypass gas path 162. The core gas path 160 extends sequentially through the engine sections 13-139. The air within the core gas path 160 may be referred to as "core air". The bypass gas path 162 extends through a bypass duct, which bypasses the engine core. The air within the bypass gas path 162 may be referred to as "bypass air".

The core air is compressed by the compressor rotors 147 and 148 and directed into a combustion chamber 164 of a combustor in the combustor section 138. Fuel is injected into the combustion chamber 164 and mixed with the compressed core air to provide a fuel-air mixture. This fuel air mixture is ignited and combustion products thereof flow through and sequentially cause the turbine rotors 149 and 150 to rotate. The rotation of the turbine rotors 149 and 150 respectively drive rotation of the compressor rotors 148 and 147 and, thus, compression of the air received from a core airflow inlet. The rotation of the turbine rotor 150 also drives rotation of the fan rotor 146, which propels bypass air through and out of the bypass gas path 162. The propulsion of the bypass air may account for a majority of thrust generated by the turbine engine 128, e.g., more than seventy-five percent (75%) of engine thrust. The turbine engine 128 of the present disclosure, however, is not limited to the foregoing exemplary thrust ratio.

The assembly 20 may be included in various turbine engines other than the one described above as well as in other types of rotational equipment. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 11), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for rotational equipment, comprising:
a stationary structure;
a rotating structure rotatable about an axial centerline; and
a non-contact seal assembly configured to substantially seal an annular gap between the stationary structure and the rotating structure, the non-contact seal assembly comprising a seal shoe configured to sealingly engage the rotating structure axially along the axial centerline; the non-contact seal assembly further comprising a seal carrier and a seal element;
the seal carrier mounted to the stationary structure; and
the seal element projecting radially out from the seal carrier towards an axially extending surface of the seal shoe such that the seal element and a portion of the seal shoe with the axially extending surface form a knife-edge seal.

2. The assembly of claim 1, wherein the non-contact seal assembly is configured as a hydrostatic seal assembly.

3. The assembly of claim 1, wherein the seal shoe is a monolithic full hoop body.

4. The assembly of claim 1, wherein the seal shoe includes a seal shoe base and a seal shoe projection that projects axially along the axial centerline out from the seal shoe base towards the rotating structure.

5. The assembly of claim 1, wherein the seal shoe sealingly engages and is axially adjacent a radially extending surface of the rotating structure;
the radially extending surface of the rotating structure has a first radial height; and
the seal shoe has a second radial height that is less than or equal to the first radial height.

6. The assembly of claim 1, wherein
the non-contact seal assembly further comprises a spring structure; and
the spring structure flexibly connects the seal shoe to the seal carrier.

7. The assembly of claim 6, wherein
the non-contact seal assembly further comprises a second spring structure; and
the second spring structure further flexibly connects the seal shoe to the seal carrier.

8. The assembly of claim 6, wherein
the spring structure comprises a plurality of ligaments arranged in an annular array about the axial centerline; and
each of the plurality of ligaments extends radially out from the seal shoe to the seal carrier.

9. The assembly of claim 8, wherein a first of the plurality of ligaments is circumferentially tapered.

10. The assembly of claim 1, wherein
the seal shoe is coupled to the seal carrier; and
the seal shoe is configured to axially and/or circumferentially shift relative to the seal carrier.

11. The assembly of claim 1, wherein
the non-contact seal assembly further comprises a seal carrier and a second seal element; and
the second seal element projects axially along the axial centerline out from the seal carrier and into a groove in the seal shoe such that the second seal element and a portion of the seal shoe with the groove form a labyrinth seal.

12. The assembly of claim 1, wherein the non-contact seal assembly further comprises a plurality of ligaments arranged in an annular array;
the plurality of ligaments extend between and couple the seal shoe and the seal carrier; and
the seal shoe projects axially along the axial centerline into a channel in the seal carrier.

13. The assembly of claim 1, wherein
the non-contact seal assembly further comprises a seal carrier and a plurality of ligaments that extend radially between and couple the seal shoe and the seal carrier; and
a monolithic body includes at least the seal shoe, the seal carrier and the plurality of ligaments.

14. An assembly for rotational equipment, comprising:
a stationary structure;
a rotating structure rotatable about an axial centerline; and
a non-contact seal assembly configured to substantially seal an annular gap between the stationary structure and the rotating structure, the non-contact seal assembly comprising a seal shoe configured to sealingly engage the rotating structure axially along the axial centerline;
the non-contact seal assembly further comprising a seal carrier and a spring structure;
the seal carrier mounted to the stationary structure;
the spring structure flexibly connecting the seal shoe to the seal carrier;
the spring structure comprising a plurality of ligaments arranged in an annular array about the axial centerline; and
each of the plurality of ligaments extending radially out from the seal shoe to the seal carrier;
wherein a first of the plurality of ligaments is axially tapered.

15. An assembly for rotational equipment, comprising:
a seal carrier extending circumferentially around an axial centerline;
a seal shoe extending circumferentially around the axial centerline, the seal shoe projecting axially into an annular channel in the seal carrier, and the seal shoe configured to sealingly engage a radially extending surface axially along the axial centerline;
a plurality of flexible ligaments arranged in an annular array within the annular channel, each of the plurality of flexible ligaments extending radially between and connected to the seal shoe and the seal carrier, wherein the plurality of flexible ligaments enable axial and/or lateral shifting of the seal shoe relative to the seal carrier; and
a seal element projecting radially out from the seal carrier towards an axially extending surface of the seal shoe such that the seal element and a portion of the seal shoe with the axially extending surface form a knife-edge seal.

16. The assembly of claim 15, wherein a first of the plurality of flexible ligaments is axially tapered.

17. The assembly of claim 15, wherein a first of the plurality of flexible ligaments is laterally tapered.

18. The assembly of claim 15, further comprising a second seal element projecting axially along the axial centerline out from the seal carrier and into a groove in the seal shoe such that the second seal element and a portion of the seal shoe with the groove form a labyrinth seal.

\* \* \* \* \*